(12) United States Patent
Ishigo

(10) Patent No.: US 8,690,437 B2
(45) Date of Patent: Apr. 8, 2014

(54) CONNECTING ROD BEARING OF INTERNAL COMBUSTION ENGINE

(75) Inventor: Osamu Ishigo, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 24 days.

(21) Appl. No.: 13/597,666

(22) Filed: Aug. 29, 2012

(65) Prior Publication Data

US 2013/0064487 A1    Mar. 14, 2013

(30) Foreign Application Priority Data

Sep. 8, 2011   (JP) ................. 2011-195544

(51) Int. Cl.
*F16C 33/10* (2006.01)

(52) U.S. Cl.
USPC ........................................... 384/288

(58) Field of Classification Search
USPC .......................... 384/288, 294, 291
See application file for complete search history.

(56) References Cited

U.S. PATENT DOCUMENTS

| | | | | |
|---|---|---|---|---|
| 8,147,144 B2* | 4/2012 | Ishigo et al. | ................. | 384/288 |
| 8,408,799 B2* | 4/2013 | Ishigo et al. | ................. | 384/288 |
| 2010/0316313 A1* | 12/2010 | Ishigo et al. | ................. | 384/288 |
| 2011/0243486 A1* | 10/2011 | Ukai et al. | ................. | 384/288 |

FOREIGN PATENT DOCUMENTS

| | | |
|---|---|---|
| JP | 58-146713 | 9/1983 |
| JP | 63-167804 | 12/1988 |
| JP | 08-277831 | 10/1996 |
| JP | 2005-069283 | 3/2005 |
| JP | 2009-174697 | 8/2009 |
| JP | 2010-285966 | 12/2010 |
| JP | 2011-058567 | 3/2011 |
| WO | WO 2009/128538 | 10/2009 |

OTHER PUBLICATIONS

Office Action issued Jul. 19, 2013 in corresponding Japanese Patent Application Serial No. 2011-195544 (two pages) (English translation not available).

* cited by examiner

*Primary Examiner* — Thomas R Hannon
(74) *Attorney, Agent, or Firm* — Harness, Dickey & Pierce, P.L.C.

(57) ABSTRACT

Disclosed is a connecting rod bearing for a crankshaft of an internal combustion engine, the connecting rod bearing comprising a pair of semi-cylindrical bearings. In at least one of the semi-cylindrical bearings, a front side circumferential groove is formed from the front side circumferential end surface, and in the opposed semi-cylindrical bearing, a rear side circumferential groove is formed from the rear side circumferential end surface. A circumferential length of the front side circumferential groove is larger than a circumferential length of the front side crush relief, and a circumferential length of the rear side circumferential groove is smaller than a circumferential length of the rear side crush relief.

13 Claims, 10 Drawing Sheets

CONNECTING ROD BEARING OF INTERNAL COMBUSTION ENGINE

INCORPORATION BY REFERENCE

The present application claims priority from JP Patent Application Ser. No. 2011-195544 filed on Sep. 8, 2011, the content of which is hereby incorporated by reference into this application.

BACKGROUND OF THE INVENTION (1) Field of the Invention

The present invention relates to a connecting rod bearing (i.e. a slide bearing) for internal combustion engines, which rotatably supports a crankpin connecting a connecting rod and a crankshaft, wherein lubricant oil is supplied to an inner surface of a main bearing, which supports the crankshaft, and further to an inner surface of the connecting rod bearing through an internal lubricant-oil passage formed in the crankshaft.

(2) Related Art

A crankshaft of an internal combustion engine is supported in a lower section of a cylinder block of the internal combustion engine at a journal section thereof through a main bearing consisting of a pair of semi-cylindrical bearings. In the main bearing, lubricant oil discharged from an oil pump is fed into an oil groove, being formed on the inner surface of the main bearing, through an oil gallery formed in the cylinder block wall and a through hole formed in the main bearing wall. A first lubricant-oil passage is diametrically formed through the journal section, and openings at the both ends of the first lubricant-oil passage are in fluid communication with the oil groove. Further, a second lubricant-oil passage is formed in the crankshaft so as to branch off from the diametrical first lubricant-oil passage in the journal section to go through a crank arm, which second lubricant-oil passage is in fluid communication with a third lubricant-oil passage diametrically formed through a crankpin. Thus, the lubricant oil fed from the oil gallery in the cylinder block wall via the through hole formed in the main bearing wall into the oil groove formed on the inner surface of the main bearing flows through the first, second and third lubricant-oil passages, and be supplied between sliding surfaces of the crankpin and a connecting rod bearing from outlet ports at both ends of the third lubricant-oil passage (which is a lubricant-oil outlet port existing on the surface of the crankpin).

The lubricant oil fed from the cylinder block of the internal combustion engine through the journal section of the crankshaft to the connecting rod bearing might carry foreign substances remaining in the respective lubricant-oil passages. If such foreign substances entrained by the lubricant oil are fed between the crankpin and the connecting rod bearing, there is a risk that the foreign substances damage the sliding surface of the connecting rod bearing. Thus, it is needed to quickly discharge the foreign substances from the sliding surface of the crankpin and the connecting rod bearing to outside.

As a countermeasure against the foreign substances accompanied with the lubricant oil, there has been a proposal to discharge the foreign substances by providing a circumferential oil groove throughout the entire circumferential length of the inner surface of one of the semi-cylindrical bearings of the main bearing which consists of a pair of the semi-cylindrical bearings and which supports the journal section of the crankshaft, the one of the semi-cylindrical bearings having a through hole which directly receives the lubricant oil supplied from the oil gallery in the cylinder block wall. When the above idea is applied to the connecting rod bearing, however, it was confirmed by an experiment that not only the foreign substance discharge effect is obtainable but also the proposed way is counterproductive since the foreign substances remain in the circumferential oil groove formed throughout the entire circumferential length of the inner surface of the semi-cylindrical bearing of the connecting rod bearing, and are dispersed throughout the sliding surface of the bearing thereby becoming liable to damage the bearing.

This is because in general a housing, which holds the connecting rod bearing, is considerably deformed during engine operation, so that a clearance between the crankpin and the connecting rod bearing during the engine operation is larger than a clearance between the journal section of the crankshaft and the main bearing, so that the foreign substances remaining in the oil groove are liable to be dispersed throughout the sliding surface of the bearing including "a circumferential center section of the semi-cylindrical bearing" as a primary load receiving section. Such a connecting rod bearing suffers increased damages as compared with a conventional connecting rod bearing without such a circumferential oil groove. This was confirmed by an experiment.

Therefore, in order to discharge foreign substances flowing onto the sliding surface of the connecting rod bearing together with the lubricant oil from the lubricant-oil outlet port on the crankpin surface, the present inventor has proposed the connecting rod bearing in which at least in one of a pair of semi-cylindrical bearings constituting the connecting rod bearing, a front side circumferential groove is formed along the bearing inner circumferential surface from the front side circumferential end surface which is positioned at a front side with respect to the rotational direction of the crankpin, and the axial groove which communicates with the front side circumferential groove is formed throughout the entire length of the width in the axial direction along the bearing inner circumferential surface (JP-A-2009-174697). According to the configuration, the foreign substances accompanying the lubricant oil supplied from the lubricant-oil outlet port located on the outer surface of the crankpin are caught by the front side circumferential groove, and are fed to the vicinity of the circumferential end surface together with the lubricant oil along the front side circumferential groove. Subsequently, the foreign substances are blocked by the circumferential end surface of the opposed semi-cylindrical bearing, and the foreign substances are prevented from flowing onto the sliding surface of the opposed semi-cylindrical bearing. The foreign substances blocked by the circumferential end surface of the opposed semi-cylindrical bearing flow into the axial groove and are discharged to the outside of the bearing.

In the internal combustion engines of recent years, oil pumps have been miniaturized in order to reduce fuel consumption, the amounts of the lubricant oils supplied to the bearing sliding surfaces have been reduced as compared with the conventional internal combustion engines, and shortage of supply of the lubricant oil to the bearing sliding surface have occurred.

Excellence in foreign substance discharging property and excellence in suppliability of the lubricant oil onto the bearing sliding surface are required for the connecting rod bearings of internal combustion engines.

Here we would raise the following patent publications of the related art:
1. JP-A-8-277831
2. JP-A-2005-69283
3. JP-A-2009-174697

BRIEF SUMMARY OF THE INVENTION

An object of the present invention is to provide a connecting rod bearing which is capable of quickly discharging foreign substances accompanying a lubricant oil which is fed onto the connecting rod bearing via a journal section of a crankshaft from a cylinder block of an internal combustion engine, from the connecting rod bearing, and further is excellent in suppliability of the lubricant oil to the bearing sliding surface.

In the light of the above object, according to one aspect of the present invention, the following connecting rod bearing for a crankshaft of an internal combustion engine is provided.

A connecting rod bearing for a crankshaft of an internal combustion engine which rotatably supports a crankpin of a crankshaft having an internal lubricant-oil passage, wherein the connecting rod bearing is constituted of a pair of semi-cylindrical bearings, the pair of semi-cylindrical bearings each having a front side circumferential end surface positioned at a front side with respect to a rotational direction of the crankpin, and a rear side circumferential end surface positioned at a rear side, the front side circumferential end surface of one of the semi-cylindrical bearings and the rear side circumferential end surface of the other one of the semi-cylindrical bearings abutting on each other, in at least one of the semi-cylindrical bearings, a front side circumferential groove being formed along a bearing inner circumferential surface from the front side circumferential end surface within a range of a maximum central angle of 45 degrees, in the opposed semi-cylindrical bearing, a rear side circumferential groove which communicates with the front side circumferential groove being formed along a bearing inner circumferential surface from the rear side circumferential end surface within a range of a maximum central angle of 45 degrees, an axial groove which communicates with the front side circumferential groove and the rear side circumferential groove being formed throughout an entire length of a width in an axial direction along the bearing inner circumferential surface, in at least one of the semi-cylindrical bearings, a front side crush relief being formed along the bearing inner circumferential surface from the front side circumferential end surface on which the front side circumferential groove is formed, in the opposed semi-cylindrical bearing, a rear side crush relief being formed along the bearing inner circumferential surface from the rear side circumferential end surface on which the rear side circumferential groove is formed, a circumferential length of the front side circumferential groove being larger than a circumferential length of the front side crush relief, and a circumferential length of the rear side circumferential groove being smaller than a circumferential length of the rear side crush relief.

In one embodiment of the present invention, the circumferential length of the front side circumferential groove and the circumferential length of the front side crush relief satisfy the following relational expression:

the circumferential length of the front side circumferential groove−the circumferential length of the front side crush relief≧1 mm.

In one embodiment of the present invention, the circumferential length of the rear side circumferential groove and the circumferential length of the rear side crush relief satisfy the following relational expression:

the circumferential length of the rear side crush relief−the circumferential length of the rear side circumferential groove≧1 mm.

In one embodiment of the present invention, in a communicating portion in which the front side circumferential groove, the rear side circumferential groove, and the axial groove communicate with one another, a depth of the front side circumferential groove is larger than a depth of the rear side circumferential groove, whereby a step portion in a depth direction of the circumferential grooves is formed.

In one embodiment of the present invention, in the communicating portion, the depth ($D2$) of the rear side circumferential groove is 0.2 to 0.9 times as large as the depth ($D1$) of the front side circumferential groove.

In this case, the depth of the circumferential groove is a distance from the bearing inner circumferential surface to the groove bottom. In regard with the portion where the axial groove or crush relief is present, the depth is a distance from the bearing inner circumferential surface to the groove bottom when it is assumed that the axial groove or crush relief is absent.

In another embodiment of the present invention, in the communicating portion, the depth of the front side circumferential groove, the depth of the rear side circumferential groove, and a depth of the axial groove satisfy the following relational expression:

the depth ($D1$) of the front side circumferential groove>the depth ($D3$) of the axial groove>the depth ($D2$) of the rear side circumferential groove.

In this case, the depth of the axial groove is a distance from the bearing inner circumferential surface to the groove bottom when it is assumed that the axial groove or crush relief is absent.

In still another embodiment of the present invention, in the communicating portion, a groove sectional area of the front side circumferential groove seen from a circumferential direction of the connecting rod bearing is larger than a groove sectional area of the axial groove seen from an axial direction of the connecting rod bearing.

In yet another embodiment of the present invention, in the communicating portion, a groove width of the front side circumferential groove is larger than a groove width of the rear side circumferential groove, whereby a step portion in a groove width direction of the circumferential grooves is formed.

In yet another embodiment of the present invention, the axial groove is formed by cutting at least either one of a bearing inner circumferential surface side of the front side circumferential end surface in which the front side circumferential groove is formed, or a bearing inner circumferential surface side of the rear side circumferential end surface in which the rear side circumferential groove is formed.

In still another embodiment of the present invention, the depth of the front side circumferential groove becomes gradually smaller as the front side circumferential groove is apart from the front side circumferential end surface.

In yet another embodiment of the present invention, the front side circumferential groove is formed in only one of the semi-cylindrical bearings.

In still another embodiment of the present invention, the front side circumferential grooves are formed in both of the semi-cylindrical bearings.

According to a second aspect of the present invention, an internal combustion engine including the above described connecting rod bearing is provided.

By adopting the configuration of the present invention, the connecting rod bearing is provided, which is capable of quickly discharging foreign substances accompanying the lubricant oil fed to the connecting rod bearing from the connecting rod bearing, and is excellent in suppliability of the lubricant oil to the bearing sliding surface.

DETAILED DESCRIPTION OF THE INVENTION

Herein below, referring to the accompanying drawings, there will be provided a description of some embodiments of the present invention.

Figure 1:
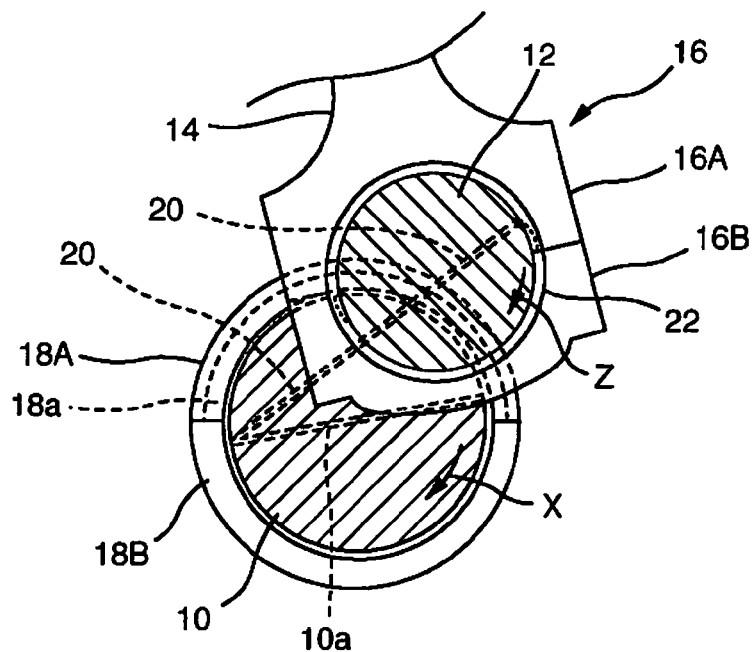
FIG. 1 is a schematic view of a crankshaft of an internal combustion engine sectioned in a journal section and a crankpin section.
Figure 2:
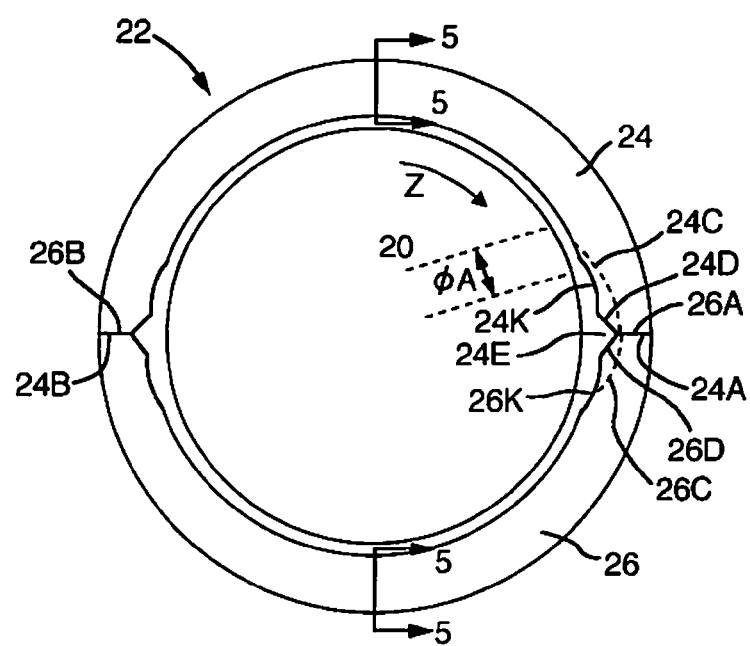
FIG. 2 is an elevation view of a connecting rod bearing according to embodiment 1 of the present invention.
Figure 3:
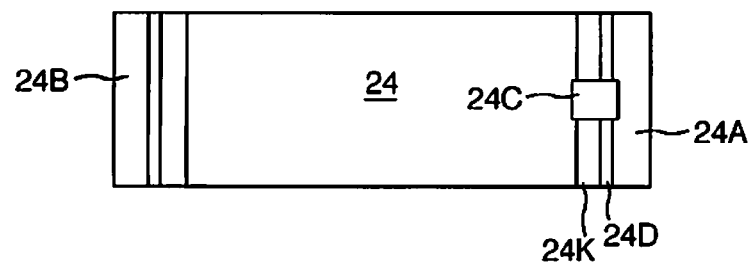
FIG. 3 is a plan view of one of semi-cylindrical bearings of the connecting rod bearing shown in FIG. 2 seen from a bearing inner circumferential surface side.
Figure 4:
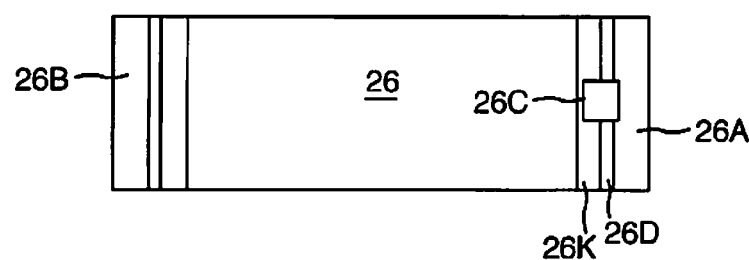
FIG. 4 is a plan view of the other semi-cylindrical bearing of the connecting rod bearing shown in FIG. 2 seen from the bearing inner circumferential surface side.
Figure 5:
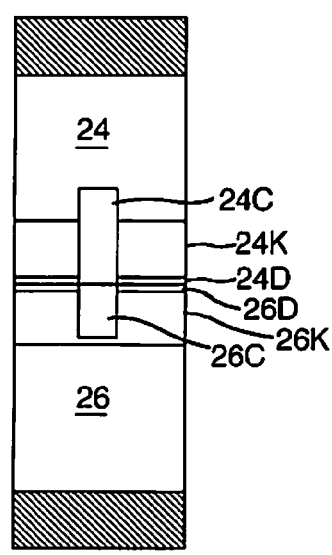
FIG. 5 is a plan view of the connecting rod bearing shown in FIG. 2 seen from a 5-5 section.

FIG. 1 is a schematic view of a crankshaft of an internal combustion engine sectioned in a journal section and a crankpin section, respectively, in which 10 denotes a journal, 12 a crankpin and 14 a connecting rod. With regard to a positional relationship among these three members in the vertical direction to the drawing sheet, the journal 10 is present in most backside of the drawing sheet, and the crankpin 12 is present in front side of the drawing sheet, wherein the crankpin 12 is surrounded by a big end housing 16 of the connecting rod 14 which carries a piston on the other end.

The journal 10 is supported in a lower portion of a cylinder block of the internal combustion engine through a pair of semi-cylindrical bearings 18A and 18B. The semi-cylindrical bearing 18A positioned on the upper side in the drawing is provided with an oil groove 18a on the inner surface throughout the circumferential entire length of the bearing 18A.

The journal 10 has a diametrically formed through hole 10a. When the journal 10 rotates in the direction of the arrow X, openings at the both ends of the through hole 10a alternately communicates with the oil groove 18a.

A lubricant-oil passage 20 is formed in the crankshaft through the journal 10, a crank arm (not-shown) and the crankpin 12.

The crankpin 12 is held by the big end housing 16 (which is constituted of a connecting rod side big end housing 16A and a cap side big end housing 16B) of the connecting rod 14 via a pair of semi-cylindrical bearings 24 and 26. The semi-cylindrical bearings 24 and 26 are assembled with but end surfaces thereof being butted to each other to form a cylindrical connecting rod bearing 22.

Embodiment 1

FIGS. 2 to 6 show the details of a pair of semi-cylindrical bearings 24 and 26 constituting the connecting rod bearing 22. The semi-cylindrical bearing 24 has a front side circumferential end surface 24A which is positioned at a front side with respect to a rotational direction Z of the crankpin 12, and a rear side circumferential end surface 24B which is positioned at a rear side. The semi-cylindrical bearing 26 has a front side circumferential end surface 26B which is positioned at the front side with respect to the rotational direction Z of the crankpin 12, and a rear side circumferential end surface 26A which is positioned at the rear side. The front side circumferential end surface 24A of the semi-cylindrical bearing 24 and the rear side circumferential end surface 26A of the semi-cylindrical bearing 26 abut on each other, and the front side circumferential end surface 26B of the semi-cylindrical bearing 26 and the rear side circumferential end surface 24B of the semi-cylindrical bearing 24 abut on each other.

In the semi-cylindrical bearing 24, a front side circumferential groove 24C is formed along the bearing inner circumferential surface from the front side circumferential end surface 24A within a range of a maximum central angle of 45 degrees. Further, in the semi-cylindrical bearing 26 which is opposed to the semi-cylindrical bearing 24, a rear side circumferential groove 26C is formed along the bearing inner circumferential surface from the rear side circumferential end surface 26A in a range of a maximum central angle of 45 degrees. The rear side circumferential groove 26C communicates with the front side circumferential groove 24C.

Here, the rear side circumferential groove 26C is preferably formed along the bearing inner circumferential surface from the rear side circumferential end surface 26A in the range of the central angle of not less than 3 degrees. Further, the rear side circumferential groove 26C is preferably formed along the bearing inner circumferential surface from the rear side circumferential end surface 26A in the range of the central angle of not less than 5 degrees.

A position in a bearing width direction of the front side circumferential groove 24C is determined so that the lubricant oil which is supplied from an outlet port opening of the lubricant-oil passage 20 flows into the front side circumferential groove 24C. In the present embodiment, the positions in the bearing width direction of the front side circumferential groove 24C and the rear side circumferential groove 26C are determined so that center lines in a width direction of the front side circumferential groove 24C and the rear side circumferential groove 26C conform to a center of the outlet port opening of the lubricant-oil passage.

Further, a part of a bearing inner circumferential surface side of the front side circumferential end surface 24A of the semi-cylindrical bearing 24 is cut throughout the entire length of the width in the axial direction, and a slant surface 24D is formed. Further, a part of a bearing inner circumferential surface side of the rear side circumferential end surface 26A of the semi-cylindrical bearing 26 is cut throughout the entire length of the width in the axial direction, and a slant surface 26D is formed. In this manner, by the slant surface 24D and the slant surface 26D, an axial groove 24E is formed throughout the entire length of the width in the axial direction along the bearing inner circumferential surface. The axial groove 24E communicates with the front side circumferential groove 24C and the rear side circumferential groove 26C.

In the present embodiment, while the slant surfaces 24D and 26D are provided in both of the circumferential end surfaces 24A and 26A, the slant surface may be provided on only one of the circumferential end surfaces 24A and 26A.

Further, in the present embodiment, the slant surfaces 24D and 26D are formed into plane-symmetrical shapes with respect to the circumferential end surfaces, but may be formed into asymmetrical shapes by changing the cut dimension or the like.

In the semi-cylindrical bearing 24, a front side crush relief 24K is formed along the bearing inner circumferential surface from the front side circumferential end surface 24A on which the front side circumferential groove 24C is formed. Further, in the opposed semi-cylindrical bearing 26, a rear side crush relief 26K is formed along the bearing inner circumferential surface from the rear side circumferential end surface 26A on which the rear side circumferential groove 26C is formed.

In this case, the crush relief means a bearing wall thickness reduced region which is formed by removing a bearing wall at the portion near the circumferential end surfaces of a pair of semi-cylindrical bearings, and has a curvature center different from the curvature center of the bearing inner circumferential surface (indicates the region in which the thickness is gradually reduced toward the circumferential end surface, and is as specified in SAE J506 (refer to item 3.26, and item 6.4), DIN1497, §3.2).

Figure 6:
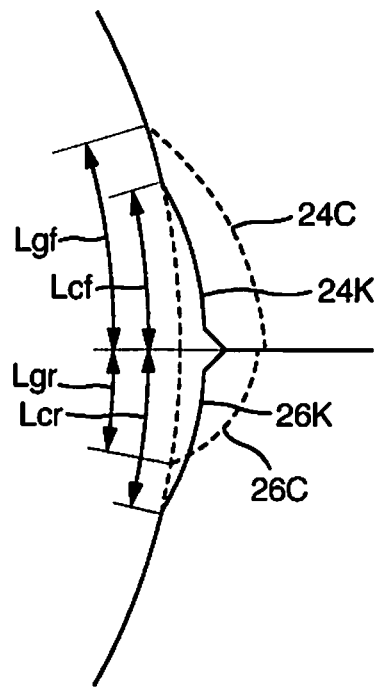
FIG. 6 is a view of a communicating portion of the connecting rod bearing shown in FIG. 2 seen from an axial direction.

As shown in FIG. 6, a circumferential length (Lgf) of the front side circumferential groove 24C is larger than a circumferential length (Lcf) of the front side crush relief 24K. Further, a circumferential length (Lgr) of the rear side circumferential groove 26C is smaller than a circumferential length (Lcr) of the rear side crush relief 26K.

In this case, the circumferential length of the circumferential groove is a length of a circular arc corresponding to the central angle at which the circumferential groove is formed in the bearing inner circumferential surface in the case of assuming that the circumferential groove is absent. With regard to the portion where the crush relief and the axial groove are present, the circumferential length of the circumferential groove is a length of a circular arc in the bearing inner circumferential surface in the case of assuming that the crush relief and the axial groove are absent.

Similarly, the circumferential length of the crush relief is a length of a circular arc corresponding to the central angle at which the crush relief is formed in the bearing inner circumferential surface in the case of assuming that the crush relief is absent. In regard with the portion where the circumferential groove and the axial groove are present, the circumferential length of the crush relief is a length of a circular arc in the bearing inner circumferential surface in the case of assuming that the circumferential groove and the axial groove are absent.

The connecting rod bearing of the present embodiment is configured as above, and a function thereof will be described hereinafter.

Figure 7:
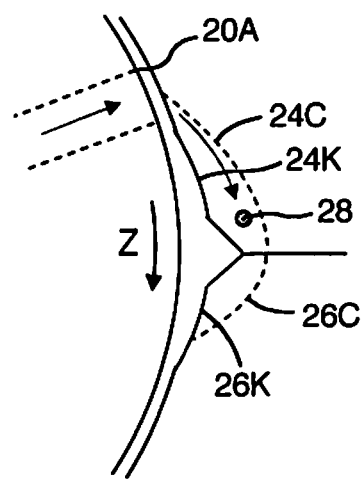
FIG. 7 is a functional explanatory view of the communicating portion of the connecting rod bearing shown in FIG. 2 seen from the axial direction.
Figure 8:
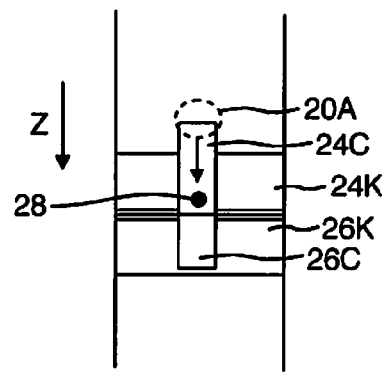
FIG. 8 is a functional explanatory view of the communicating portion of the connecting rod bearing shown in FIG. 2 seen from the bearing inner circumferential surface side.

During engine operation, a lubricant oil is supplied into the lubricant-oil groove 18a which is formed in a bearing inner circumferential surface of a main bearing which supports the journal 10. When the journal 10 is rotated, openings on the opposite ends of the through-hole 10a in the diametral direction which is formed in the journal 10 intermittently communicate with the lubricant-oil groove 18a. At the time of communication thereof, a lubricant-oil pressure acts on the inside of the through-hole 10a, and further, a lubricant-oil supply pressure also acts on the lubricant-oil passage 20 which communicates with the through-hole 10a. By the lubricant-oil supply pressure, the lubricant oil is supplied onto a sliding surface between the crankpin 12 and a connecting rod bearing 22 from the outlet port opening of the lubricant-oil passage 20 which is located in an outer circumferential surface of the crankpin 12. When the crankpin 12 is rotated, and the outlet port opening of the lubricant-oil passage 20 communicates with the front side circumferential groove 24C, the lubricant oil directly flows into the front side circumferential groove 24C. The lubricant oil which flows therein flows in the direction of the front side circumferential end surface inside the front side circumferential groove together with foreign substances accompanying the lubricant oil As shown in FIGS. 7 and 8, in the present invention, the circumferential length of the front side circumferential groove is larger than the circumferential length of the front side crush relief, and therefore, when the outlet port opening 20A of the lubricant-oil passage of the crank pin which rotates in the Z direction starts to communicate with the front side circumferential groove 24C, a part of the outlet port opening of the lubricant-oil passage communicates with the front side circumferential groove, but the remaining part is blocked by the bearing inner circumferential surface (refer to FIGS. 7 and 8). At this time, the oil pressure inside the lubricant-oil passage of the crankpin is high, an extremely rapid oil flow is formed from the inside of the front side circumferential groove 24C into the rear side circumferential groove 26C, and supply of the lubricant oil onto the bearing sliding surface downstream of the rear side circumferential groove 26C is promoted.

Here, the extremely rapid jet flow at the instant when the outlet port opening of the lubricant-oil passage and the front side circumferential groove start to communicate with each other does not include foreign substances which are too large to flow into a bearing gap. This is because the communication area at the instant when the outlet port opening of the lubricant-oil passage and the front side circumferential groove start to communicate with each other is small, and therefore, only lubricant oil passes therethrough, whereas foreign substances cannot pass therethrough.

Further, when communication of the outlet port opening of the lubricant-oil passage and the front side circumferential groove progresses, the foreign substances which are too large to flow into the bearing gap flow into the front side circumferential groove together with the lubricant oil and are reliably caught therein.

Foreign substances which are small enough to flow into the bearing gap pass through the bearing gap to be discharged together with the lubricant oil, and therefore, does not become a cause of damage to the bearing sliding surface. It is the foreign substances larger than the bearing gap that become the cause of damage to the sliding surface of the bearing.

When the circumferential length of the front side circumferential groove is smaller than the circumferential length of the front side crush relief unlike the present invention (refer to FIGS. 9 and 10), the outlet port opening of the lubricant-oil passage on the crankpin surface first communicates with a gap (hereinafter, a relief gap) between the crush relief surface and the crankpin surface. The outlet port opening of the lubricant-oil passage does not directly communicate with a terminal end portion of the front side circumferential groove, but communicates with the terminal end portion via the relief gap. Therefore, as shown in FIG. 10, the lubricant oil including foreign substances not only flows into the front side circumferential groove, but also dispersedly flows into the relief gap.

Thereby, the flow speed of the lubricant oil which flows from the inside of the front side circumferential groove into the rear side circumferential groove becomes low, and therefore suppliability of the lubricant oil onto the bearing sliding surface downstream of the rear side circumferential groove is significantly reduced.

Figure 9:
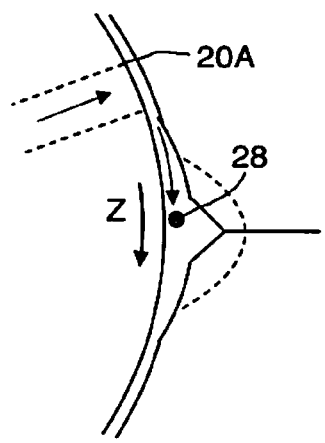
FIG. 9 is a functional explanatory view of a communicating portion of a connecting rod bearing which is not according to the present invention seen from an axial direction.
Figure 10:
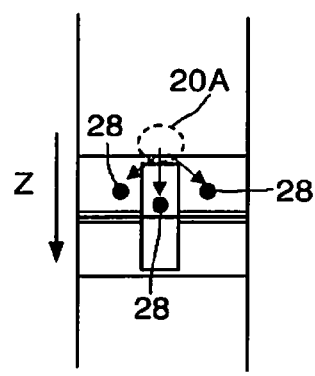
FIG. 10 is a functional explanatory view of the communicating portion of the connecting rod bearing shown in FIG. 9 seen from a bearing inner circumferential surface side.

Further, the foreign substance which dispersedly flows into the relief gap is located near the crankpin surface as shown in FIG. 9, and therefore, easily passes over the axial groove by being influenced by the flow of the oil which flows in the circumferential direction by following the crankpin surface which is rotating. The foreign substance which passes over the axial groove flows into the downstream bearing sliding surface, and has a high probability of damaging the bearing sliding surface.

In order to enhance catchability of foreign substances by the front side circumferential groove, and in order to ensure the suppliability of the lubricant oil onto the bearing sliding surface downstream of the rear side circumferential groove, the circumferential length (Lgf) of the front side circumferential groove and the circumferential length (Lcf) of the front side crush relief preferably satisfy the following relational expression:

the circumferential length ($Lgf$) of the front side circumferential groove−the circumferential length ($Lcf$) of the front side crush relief≧1 mm.

Furthermore, the circumferential length (Lgf) of the front side circumferential groove and the circumferential length (Lcf) of the front side crush relief preferably satisfy the following relational expression:

the circumferential length ($Lgf$) of the front side circumferential groove−the circumferential length ($Lcf$) of the front side crush relief≧a bore diameter ($\phi A$) of the outlet port opening of the lubricant-oil passage of the crankpin×¼.

A main function of the rear side circumferential groove is promotion of the lubricant oil supply onto the bearing sliding surface downstream of the rear side circumferential groove. Accordingly, the foreign substances are likely to pass over the axial groove and flow into the rear side circumferential groove.

The reason why the circumferential length of the rear side circumferential groove is made smaller than the circumferential length of the rear side crush relief in the present invention is to cope with the foreign substances which have flown in the rear side circumferential groove.

Figure 11:
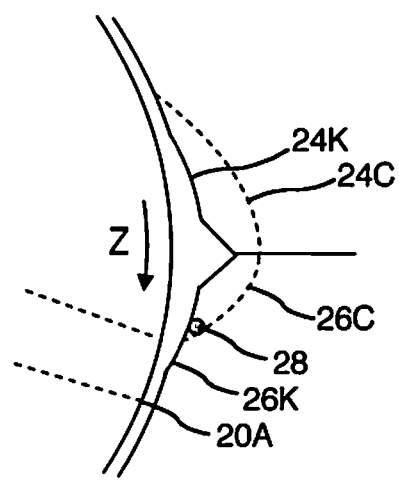
FIG. 11 is a functional explanatory view of the communicating portion of the connecting rod bearing shown in FIG. 2 seen from the axial direction.
Figure 12:
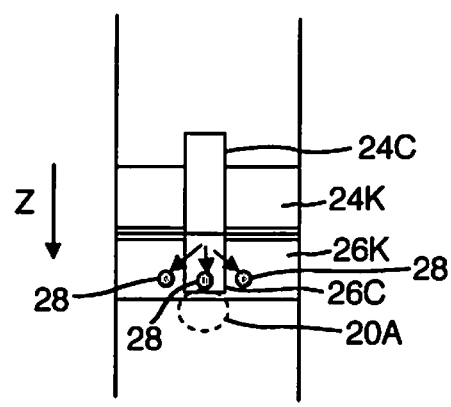
FIG. 12 is a functional explanatory view of the communicating portion of the connecting rod bearing shown in FIG. 2 seen from the bearing inner circumferential surface side.

As shown in FIGS. 11 and 12, the foreign substances which flow into the rear side circumferential groove flow toward the terminal end portion of the rear side circumferential groove together with the lubricant oil. The terminal end portion of the rear side circumferential groove is located at the crush relief surface, and therefore, the lubricant oil which flows in the rear side circumferential groove also dispersedly flow in the relief gap, as shown in FIG. 12. Accordingly, the foreign substances do not concentrate in only the terminal end portion of the rear side circumferential groove.

Furthermore, even though a few foreign substances reach the terminal end portion of the rear side circumferential groove without dispersedly flowing into the relief gap, the foreign substances are not brought into contact with the edge of the outlet port opening of the lubricant-oil passage on the crankpin surface immediately, and do not get drawn into the bearing sliding surface, because the relief gap is present as shown in FIG. 11.

Further, the foreign substances which flow into the relief gap from the terminal end portion of the rear side circumferential groove can move in the axial direction inside the relief gap. Accordingly, the foreign substances which reach the terminal end portion of the rear side circumferential groove have a high probability of being flown from the place where the foreign substances are in contact with the edge of the outlet port opening of the lubricant-oil passage, by the time when the outlet port opening of the lubricant-oil passage on the crankpin surface passes next.

Figure 13:
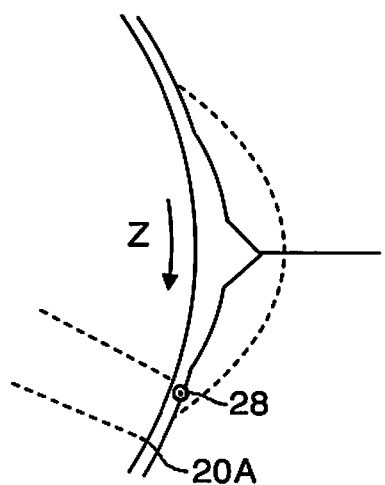
FIG. 13 is a functional explanatory view of a communicating portion of a connecting rod bearing which is not according to the present invention seen from an axial direction.
Figure 14:
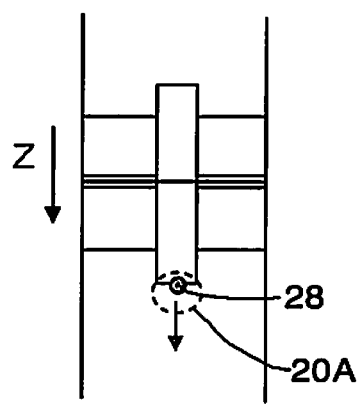
FIG. 14 is a functional explanatory view of the communicating portion of the connecting rod bearing shown in FIG. 13 seen from a bearing inner circumferential side.

When the circumferential length of the rear side circumferential groove is larger than the circumferential length of the rear side crush relief, unlike the present invention (refer to FIGS. 13 and 14), the foreign substance which flows into the rear side circumferential groove is guided by the groove side wall of the rear side circumferential groove, and therefore reach the terminal end portion of the rear side circumferential groove without getting out of the rear side circumferential groove. Subsequently, the foreign substance which reaches the terminal end portion of the rear side circumferential groove is prevented from moving in the axial direction by the groove side wall of the rear side circumferential groove, and therefore, cannot get out of the place where the foreign substance contacts the edge of the outlet port opening of the lubricant-oil passage. Therefore, the foreign substance is drawn into the bearing sliding surface by contact with the edge of the outlet port opening of the lubricant-oil passage.

In order to avoid contact of the foreign substance with the edge of the outlet port opening of the lubricant-oil passage on the crankpin surface more reliably when the foreign substance flows into the rear side circumferential groove, the circumferential length (Lgr) of the rear side circumferential groove and the circumferential length (Lcr) of the rear side crush relief preferably satisfy the following relational expression:

the circumferential length (Lcr) of the rear side crush relief−the circumferential length (Lgr) of the rear side circumferential groove≥1 mm.

Furthermore, the circumferential length (Lgr) of the rear side circumferential groove and the circumferential length (Lcr) of the rear side crush relief preferably satisfy the following relational expression:

the circumferential length (Lcr) of the rear side crush relief−the circumferential length (Lgr) of the rear side circumferential groove≥the bore diameter (φA) of the outlet port opening of the lubricant-oil passage of the crankpin×¼.

Further, in the present embodiment, in the communicating portion, a groove sectional area of the front side circumferential groove 24C seen from the circumferential direction of the connecting rod bearing is larger than the groove sectional area of the axial groove 24E seen from the axial direction of the connecting rod bearing.

By adopting the above configuration, the flow speeds of the lubricant oil and the foreign substances which flow relatively slowly in the front side circumferential groove 24C increase in the axial groove 24E. Therefore, the foreign substances easily flow into the axial groove 24E, and the foreign substances are easily and smoothly discharged outside the bearing from the bearing width direction end surfaces.

Further, in the present embodiment, the depth of the front side circumferential groove becomes gradually smaller as the front side circumferential groove is apart from the front side circumferential end surface.

By adopting the configuration, the flow of the lubricant oil and the foreign substance 28 which flow inside the front side circumferential groove 24C becomes slow toward the circumferential end surfaces, and the foreign substance is reliably forced to flow into the axial groove by following the flow of the lubricant oil. Further, the flow speeds of the lubricant oil and the foreign substance 28 at the time of approaching the axial groove are low, and therefore, the foreign substance is prevented from riding over the axial groove and flowing into the mating side semi-cylindrical bearing side, by inertia force. In the present embodiment, the depth of the rear side circumferential groove also becomes gradually smaller as the rear side circumferential groove is apart from the front side circumferential end surface.

However, the depth of the front side circumferential groove can be set at a constant depth, and the depth of the rear side circumferential groove can be also set at a constant depth.

The groove width and the depth of the circumferential groove are properly selected in accordance with the specifications of an internal combustion engine. For example, in the case of the connecting rod bearing for use in a compact internal combustion engine for a passenger car, the groove width may be set at 1 to 7 mm, and the depth may be set at 0.1 to 1 mm.

In this case, the groove width of the circumferential groove is preferably set at not less than ¼ of a bore diameter (φA) of the outlet port opening of the lubricant-oil passage 20 and not more than twice the bore diameter (φA) of the outlet port opening of the lubricant-oil passage 20. Further, the groove width of the circumferential groove is preferably set as the same as the bore diameter (φA) of the outlet port opening of the lubricant-oil passage 20.

Further, the size of the axial groove is preferably such that the groove width is less than 2 mm and the depth is 0.1 to 0.5 mm. As for the sizes of the foreign substances which are included in the lubricant oil, the length is approximately 0.1 mm at the maximum, and the dimension of the axial groove is determined with consideration given to the foreign substance discharging property.

Embodiment 2

Figure 15:
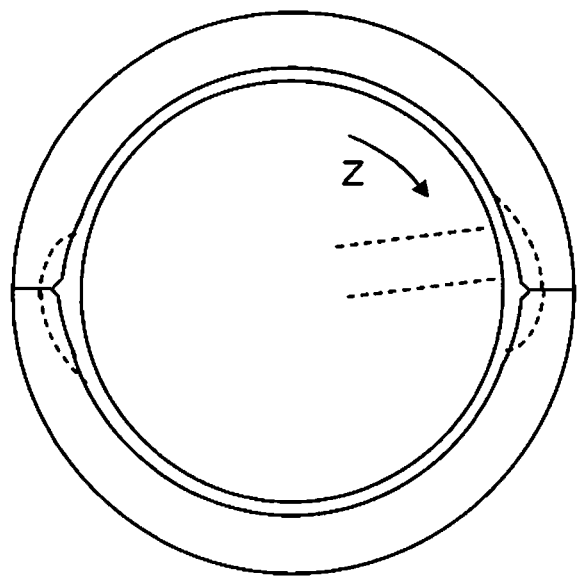
FIG. 15 is an elevation view of a connecting rod bearing according to embodiment 2 of the present invention.

In embodiment 1, the aforementioned circumferential grooves and the axial groove are formed on only one of the butt end surfaces, whereas in embodiment 2, the similar circumferential grooves and axial groove are also formed on the other one of the butt end surfaces (refer to FIG. 15).

By adopting the configuration, foreign substance discharge, and lubricant oil supply onto the bearing sliding surface are promoted in both of the butt end surfaces.

In the present embodiment, as a preferred example, the front side circumferential grooves, the rear side circumferential grooves, and the axial grooves on both the butt end surfaces are formed into line-symmetrical shapes around the axial line of the connecting rod bearing 22, respectively.

By adopting the configuration, commonality of components of the semi-cylindrical bearings can be achieved. However, the present invention is not limited to the present embodiment, and the front side circumferential grooves, the rear side circumferential grooves, and the axial grooves on both the butt end surfaces may be formed into asymmetrical shapes with respect to the bearing center line, respectively. More specifically, the front side circumferential grooves, the rear side circumferential grooves, and the axial grooves of both the butt end surfaces do not have to be formed into the same sizes, and may have different circumferential lengths, groove widths and depths, in the range in which the function of the present invention is kept.

Embodiment 3

Figure 16:
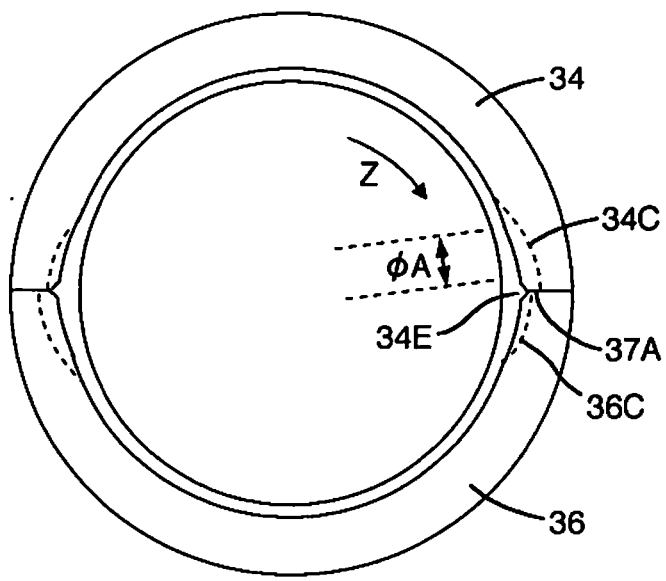
FIG. 16 is an elevation view of a connecting rod bearing according to embodiment 3 of the present invention.

Further, as shown in FIG. 16, in embodiment 3, in a communicating portion where a front side circumferential groove 34C, a rear side circumferential groove 36C, and an axial groove 34E communicate with one another, a depth of the front side circumferential groove 34C is larger than a depth of the rear side circumferential groove 36C, whereby a step portion 37A in the depth direction of the circumferential grooves is formed.

Figure 17:
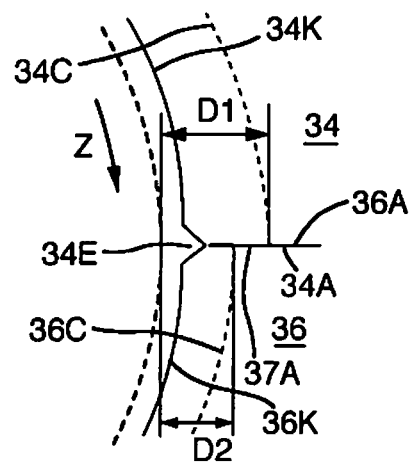
FIG. 17 is a view of a communicating portion of the connecting rod bearing shown in FIG. 16 seen from an axial direction.

FIG. 17 is a view of the communicating portion where the front side circumferential groove 34C, the rear side circumferential groove 36C, and the axial groove 34E communicate with one another seen from the axial direction. As is also known from FIG. 17, a depth (D1) of the front side circumferential groove 34C in a front side circumferential end surface 34A is larger than a depth (D2) of the rear side circumferential groove 36C in a rear side circumferential end surface 36A, whereby a step portion 37A in the depth direction of the circumferential grooves is formed.

Figure 18:
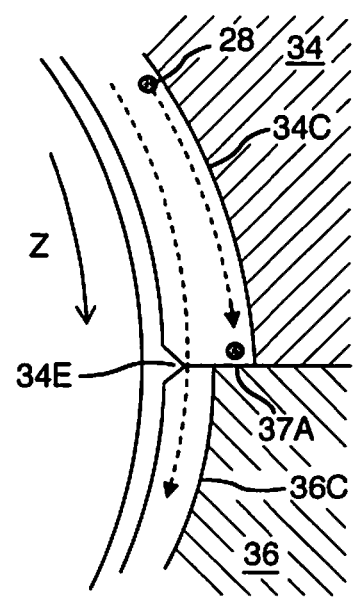
FIG. 18 is a functional explanatory view of the connecting rod bearing shown in FIG. 16.

FIG. 18 shows behaviors of the lubricant oil and a foreign substance inside the circumferential grooves by a sectional view of the communicating portion. The foreign substance 28 which has a heavy specific gravity with respect to the lubricant oil moves on the groove bottom side of the front side circumferential groove by centrifugal force. Therefore, the foreign substance 28 is sufficiently apart from a crankpin surface, and is hardly influenced by a rapid lubricant oil flow which follows the rotating crank pin surface. The step portion 37A is formed between the front side circumferential groove 34C and the rear side circumferential groove 36C, and therefore, the lubricant oil and the foreign substance 28 which flow inside the front side circumferential groove 34C are prevented from directly flowing into the rear side circumferential groove 36C. The lubricant oil and the foreign substance 28 have flow directions switched by the step portion 37A, mainly flow into the axial groove 34E, and are discharged outside the bearing from the bearing width direction end surfaces.

As described above, the foreign substance 28 is separated to the groove bottom side in the front side circumferential groove 34C, and therefore, the lubricant oil having almost no foreign substance flows to the bearing inner circumferential surface side of the front side circumferential groove 34C. The clean lubricant oil on the bearing inner circumferential surface side of the front side circumferential groove 34C directly flows into the rear side circumferential groove 36C. Accordingly, the clean lubricant oil is supplied onto the bearing sliding surface of the semi-cylindrical bearing 36 without being discharged outside the bearing through the axial groove.

In the present embodiment, in the communicating portion, a depth (D2) of the rear side circumferential groove 36C in the rear side circumferential end surface 36A is preferably 0.2 to 0.9 times as large as a depth (D1) of the front side circumferential groove 34C in the front side circumferential end surface 34A.

In order to reliably reduce the speed of the foreign substances which move to the communicating portion along the groove bottom of the front side circumferential groove, the depth (D2) of the rear side circumferential groove is preferably set at 90% or less with respect to the depth (D1) of the front side circumferential groove. More specifically, the step portion of 10% or more of the depth of the front side circumferential groove preferably blocks the flow of the lubricant oil in the front side circumferential groove. Meanwhile, in order to secure a sufficient supply amount of the lubricant oil with respect to the bearing inner circumferential surface of the semi-cylindrical bearing at the downstream side, the depth (D2) of the rear side circumferential groove is preferably set at 20% or more with respect to the depth (D1) of the front side circumferential oil groove.

Embodiment 4

Figure 19:
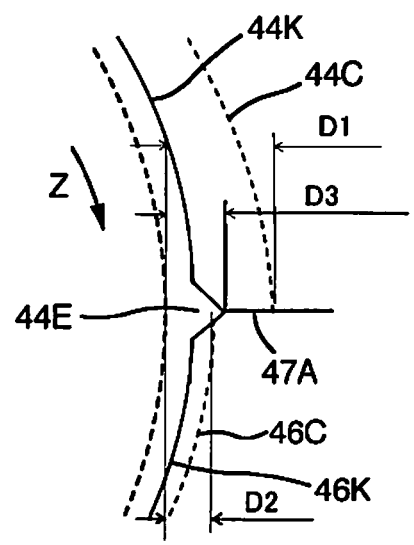
FIG. 19 is a view of a communicating portion of a connecting rod bearing according to embodiment 4 of the present invention seen from an axial direction.

FIG. 19 shows a sectional view of a communicating portion in regard with embodiment 4 of the present invention. In the embodiment, in the communicating portion, the depth (D1) of the front side circumferential groove, the depth (D2) of the rear side circumferential groove, and a depth (D3) of the axial groove satisfy the following relational expression:

the depth (D1) of the front side circumferential groove>the depth (D3) of the axial groove>the depth (D2) of the rear side circumferential groove.

In embodiment 3, the dimensional relationship of the depth (D3) of the axial groove and the depth (D2) of the rear side circumferential groove is opposite from the above, and the depth (D3) of the axial groove<the depth (D2) of the rear side circumferential groove is established. When the depth (D2) of the rear side circumferential groove is larger than the depth (D3) of the axial groove, some of the foreign substances, which flow in the groove bottom side of the front side circumferential groove and reach the communicating portion, flow into the rear side circumferential groove before reaching the axial groove.

However, by adopting the configuration of embodiment 4, the lubricant oil and the foreign substances which flow in the groove bottom side of the front side circumferential groove 44C are blocked by a step portion 47A, and thereafter, flow into an axial groove 44E first. Accordingly, the foreign substances are more easily discharged outside the bearing through the axial groove 44E than in embodiment 3, and hardly flow into a rear side circumferential groove 46C, and therefore, the foreign substance discharging effect is improved.

Embodiment 5

Figure 20:
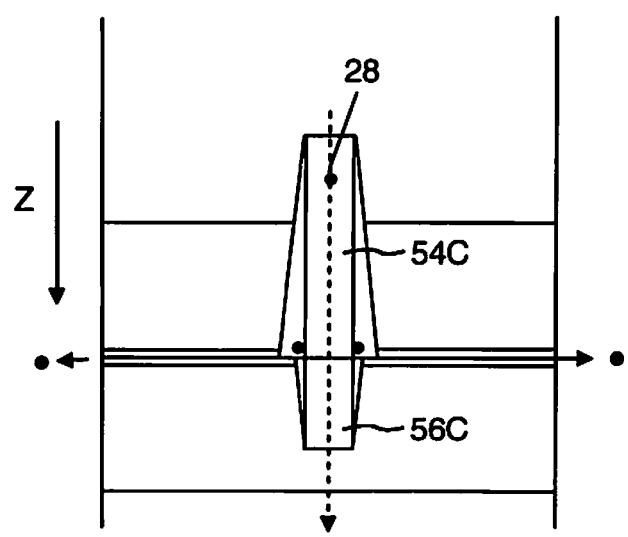
FIG. 20 is a functional explanatory view of a communicating portion of a connecting rod bearing according to embodiment 5 of the present invention seen from a bearing inner circumferential surface side.
Figure 21:
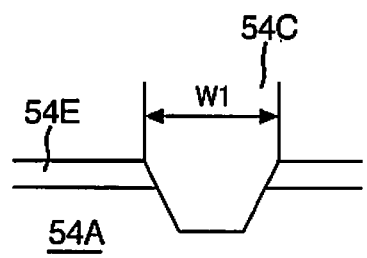
FIG. 21 is a plan view showing a front side circumferential end surface of the connecting rod bearing shown in FIG. 20.
Figure 22:
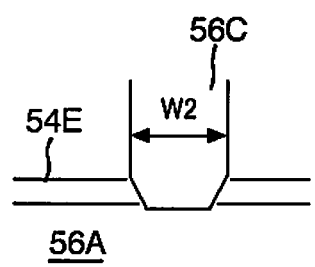
FIG. 22 is a plan view showing a rear side circumferential end surface of the connecting rod bearing shown in FIG. 20.
Figure 23:
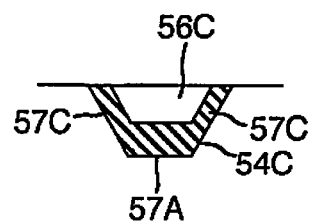
FIG. 23 is a view of a rear side circumferential groove seen from a front side circumferential groove of the connecting rod bearing shown in FIG. 20.

FIGS. 20 to 23 show embodiment 5. FIG. 20 is a view of circumferential grooves and an axial groove seen from a bearing inner circumferential surface side. FIG. 21 is a view of a front side circumferential end surface seen from a circumferential direction. FIG. 22 is a view of a rear side circumferential end surface seen from the circumferential direction. FIG. 23 shows a state in which the rear side circumferential groove is seen from the front side circumferential groove.

In the present embodiment, in a communicating portion, a groove width (W1) of a front side circumferential groove 54C is larger than a groove width (W2) of a rear side circumferential groove 56C, whereby a step portion in the groove width direction of the circumferential groove is formed (see FIG. 23).

By adopting the configuration, a step portion 57C in the groove width direction is formed in addition to the step portion 57A in the depth direction of the circumferential groove, and therefore, the effect of also blocking foreign substances which move along the side wall of the front side circumferential groove is generated. Thereby, the foreign substance discharging effect is more improved.

In the present embodiment, the side wall of the circumferential groove is a slant surface, and the groove width increases toward the bearing inner circumferential surface from the groove bottom. Accordingly, the sectional shape of the circumferential groove is a trapezoidal shape. In embodiments 1 to 4, the sectional shapes of the circumferential grooves are rectangular shapes, but in embodiment 5, the rate at which the sectional area of the circumferential groove increases toward the circumferential end surface is higher. Accordingly, the speed of the foreign substance which flows into the front side circumferential groove of embodiment 5 becomes lower toward the circumferential end surface, and the foreign substance easily flows into the axial groove. Accordingly, the foreign substance discharging effect is improved.

In this case, in regard with the sectional shape of the circumferential sectional groove, while the embodiment of the trapezoidal shape is shown, the sectional shape can be made to be any sectional shapes such as a semicircular shape and a triangular shape, besides the trapezoidal shape. As long as the step portion having a foreign substance discharging effect is formed, the circumferential groove with any sectional shape can be applied.

The invention claimed is:

1. A connecting rod bearing for a crankshaft of an internal combustion engine which rotatably supports a crankpin of a crankshaft having an internal lubricant-oil passage, wherein the connecting rod bearing comprises a pair of semi-cylindrical bearings, the pair of semi-cylindrical bearings each having a front side circumferential end surface positioned at a front side with respect to a rotational direction of the crankpin, and a rear side circumferential end surface positioned at a rear side, the front side circumferential end surface of one of the semi-cylindrical bearings and the rear side circumferential end surface of the other one of the semi-cylindrical bearings abutting on each other, in at least one of the semi-cylindrical bearings, a front side circumferential groove being formed along a bearing inner circumferential surface from the front side circumferential end surface within a range of a maximum central angle of 45 degrees, in the opposed semi-cylindrical bearing, a rear side circumferential groove which communicates with the front side circumferential groove being formed along a bearing inner circumferential surface from the rear side circumferential end surface within a range of a maximum central angle of 45 degrees, an axial groove which communicates with the front side circumferential groove and the rear side circumferential groove being formed throughout an entire length of a width in an axial direction along the bearing inner circumferential surface, in at least one of the semi-cylindrical bearings, a front side crush relief being formed along the bearing inner circumferential surface from the front side circumferential end surface on which the front side circumferential groove is formed, in the opposed semi-cylindrical bearing, a rear side crush relief being formed along the bearing inner circumferential surface from the rear side circumferential end surface on which the rear side circumferential groove is formed, a circumferential length of the front side circumferential groove being larger than a circumferential length of the front side crush relief, and a circumferential length of the rear side circumferential groove being smaller than a circumferential length of the rear side crush relief.

2. The connecting rod bearing according to claim 1, wherein the circumferential length of the front side circumferential groove and the circumferential length of the front side crush relief satisfy the following relational expression:

the circumferential length of the front side circumferential groove−the circumferential length of the front side crush relief≧1 mm.

3. The connecting rod bearing according to claim 1, wherein the circumferential length of the rear side circumferential groove and the circumferential length of the rear side crush relief satisfy the following relational expression:

the circumferential length of the rear side crush relief−the circumferential length of the rear side circumferential groove≧1 mm.

4. The connecting rod bearing according to claim 1, wherein in a communicating portion in which the front side circumferential groove, the rear side circumferential groove, and the axial groove communicate with one another, a depth of the front side circumferential groove is larger than a depth of the rear side circumferential groove, whereby a step portion in a depth direction of the circumferential grooves is formed.

5. The connecting rod bearing according to claim 1, wherein in the communicating portion, the depth of the rear side circumferential groove is 0.2 to 0.9 times as large as the depth of the front side circumferential groove.

6. The connecting rod bearing according to claim 1, wherein in the communicating portion, the depth of the front side circumferential groove, the depth of the rear side circumferential groove and a depth of the axial groove satisfy the following relational expression:

the depth of the front side circumferential groove>the depth of the axial groove>the depth of the rear side circumferential groove.

7. The connecting rod bearing according to claim 1, wherein in the communicating portion, a groove sectional area of the front side circumferential groove seen from a circumferential direction of the connecting rod bearing is larger than a groove sectional area of the axial groove seen from an axial direction of the connecting rod bearing.

8. The connecting rod bearing according to claim 1, wherein in the communicating portion, a groove width of the front side circumferential groove is larger than a groove width of the rear side circumferential groove, whereby a step portion in a groove width direction of the circumferential grooves is formed.

9. The connecting rod bearing according to claim 1, wherein the axial groove is formed by cutting at least either one of a bearing inner circumferential surface side of the front side circumferential end surface in which the front side circumferential groove is formed, or a bearing inner circumferential surface side of the rear side circumferential end surface in which the rear side circumferential groove is formed.

10. The connecting rod bearing according to claim 1, wherein the depth of the front side circumferential groove becomes gradually smaller as the front side circumferential groove is apart from the front side circumferential end surface.

11. The connecting rod bearing according to claim 1, wherein the front side circumferential groove is formed in only one of the semi-cylindrical bearings.

12. The connecting rod bearing according to claim 1, wherein the front side circumferential grooves are formed in both of the semi-cylindrical bearings.

13. An internal combustion engine, comprising: the connecting rod bearing according to claim 1.

* * * * *